United States Patent
Cevahir et al.

(10) Patent No.: US 10,487,447 B2
(45) Date of Patent: **\*Nov. 26, 2019**

(54) DIPPING SOLUTION FOR CORD FABRICS

(71) Applicant: Kordsa Teknik Tekstil A.S., Kocaeli (TR)

(72) Inventors: Nacide Nurcin Cevahir, Izmit (TR); Ali Ersin Acar, Istanbul (TR); Mustafa Yasin Sen, Izmit (TR)

(73) Assignee: KORDSA TEKNIK TEKSTIL A.S. (TR)

(*) Notice: Subject to any disclaimer, the term of this patent is extended or adjusted under 35 U.S.C. 154(b) by 411 days.

This patent is subject to a terminal disclaimer.

(21) Appl. No.: 15/317,479

(22) PCT Filed: Jun. 11, 2015

(86) PCT No.: PCT/EP2015/001182
§ 371 (c)(1),
(2) Date: Dec. 9, 2016

(87) PCT Pub. No.: WO2015/188939
PCT Pub. Date: Dec. 17, 2015

(65) Prior Publication Data
US 2017/0130396 A1    May 11, 2017

(30) Foreign Application Priority Data
Jun. 12, 2014 (EP) .................................. 14002027

(51) Int. Cl.
*D06M 15/693* (2006.01)
*D06M 15/55* (2006.01)
(Continued)

(52) U.S. Cl.
CPC ........... *D06M 15/693* (2013.01); *C08J 3/005* (2013.01); *C08J 3/03* (2013.01); *C08J 3/05* (2013.01);
(Continued)

(58) Field of Classification Search
CPC .. D06M 15/55; D06M 15/233; D06M 15/263; D06M 15/693; D06M 15/3562;
(Continued)

(56) References Cited

U.S. PATENT DOCUMENTS

| 4,472,463 A | 9/1984 | Solomon |
| 5,118,545 A | 6/1992 | Burlett et al. |

(Continued)

FOREIGN PATENT DOCUMENTS

| JP | 2011069020 A | 4/2011 |
| JP | 2012224962 A | 11/2012 |

(Continued)

OTHER PUBLICATIONS

Patent Cooperation Treaty (PCT), International Search Report and Written Opinion for Application PCT/EP2015/001182 filed Jun. 11, 2015, dated Sep. 22, 2015, International Searching Authority, EP.

(Continued)

*Primary Examiner* — Kregg T Brooks
(74) *Attorney, Agent, or Firm* — McDonald Hopkins LLC

(57) ABSTRACT

The present invention relates to a formaldehyde and resorcinol free dipping solution for cord fabrics and a production method thereof comprising the steps of adding acrylic polymer resin into water (11), adjusting pH value (12), adding epoxy to the composition (13), adding polyisocyanate to the composition (14), adding latex to the composition (15), obtaining the dipping material (16); enabling the synthetic fiber and the rubber used in cord fabric reinforced rubber materials production to be attached to each other by (Continued)

providing an interface between two said materials; not as hazardous as RFL for human health and also being environmentally friendly.

11 Claims, 1 Drawing Sheet

(51) Int. Cl.
| | |
|---|---|
| *D06M 15/263* | (2006.01) |
| *C08J 5/06* | (2006.01) |
| *C08J 3/00* | (2006.01) |
| *C08J 3/03* | (2006.01) |
| *C08J 3/05* | (2006.01) |
| *C09J 109/08* | (2006.01) |
| *C09J 133/02* | (2006.01) |
| *C09J 163/00* | (2006.01) |
| *D06M 13/395* | (2006.01) |
| *D06M 15/356* | (2006.01) |
| *D06M 15/233* | (2006.01) |
| *D06M 101/32* | (2006.01) |
| *D06M 101/36* | (2006.01) |

(52) U.S. Cl.
CPC ........... *C09J 109/08* (2013.01); *C09J 133/02* (2013.01); *C09J 163/00* (2013.01); *D06M 13/395* (2013.01); *D06M 15/233* (2013.01); *D06M 15/263* (2013.01); *D06M 15/3562* (2013.01); *D06M 15/55* (2013.01); *C08J 2309/08* (2013.01); *C08J 2433/00* (2013.01); *C08J 2463/00* (2013.01); *D06M 2101/32* (2013.01); *D06M 2101/36* (2013.01); *D06M 2200/50* (2013.01)

(58) Field of Classification Search
CPC .......................... D06M 13/395; C08L 33/02; C08L 63/00–10; C08L 9/06; C08L 9/08; C09D 133/02; C09D 163/00–10; C09D 109/06; C09D 109/08; C09J 133/02; C09J 163/00–10; C09J 109/06; C09J 109/08
See application file for complete search history.

(56) References Cited

U.S. PATENT DOCUMENTS

| | | |
|---|---|---|
| 9,394,647 B2 | 7/2016 | Ikeda et al. |
| 2004/0249053 A1 | 12/2004 | Huynh-Tran et al. |
| 2012/0041113 A1 | 2/2012 | Ikeda et al. |

FOREIGN PATENT DOCUMENTS

| | | |
|---|---|---|
| JP | 2013064037 A | 4/2013 |
| WO | 9600749 A1 | 1/1996 |
| WO | 2010125992 A1 | 11/2012 |
| WO | 2015188939 A1 | 12/2015 |

OTHER PUBLICATIONS

Patent Cooperation Treaty (PCT), International Preliminary Report on Patentability for Application PCT/EP2015/001182 filed Jun. 11, 2015, dated Aug. 24, 2016, International Preliminary Examining Authority, EP.

Office Action dated Sep. 29, 2017 for Korean Patent Application No. 10-2016-7034046 filed Dec. 5, 2016.

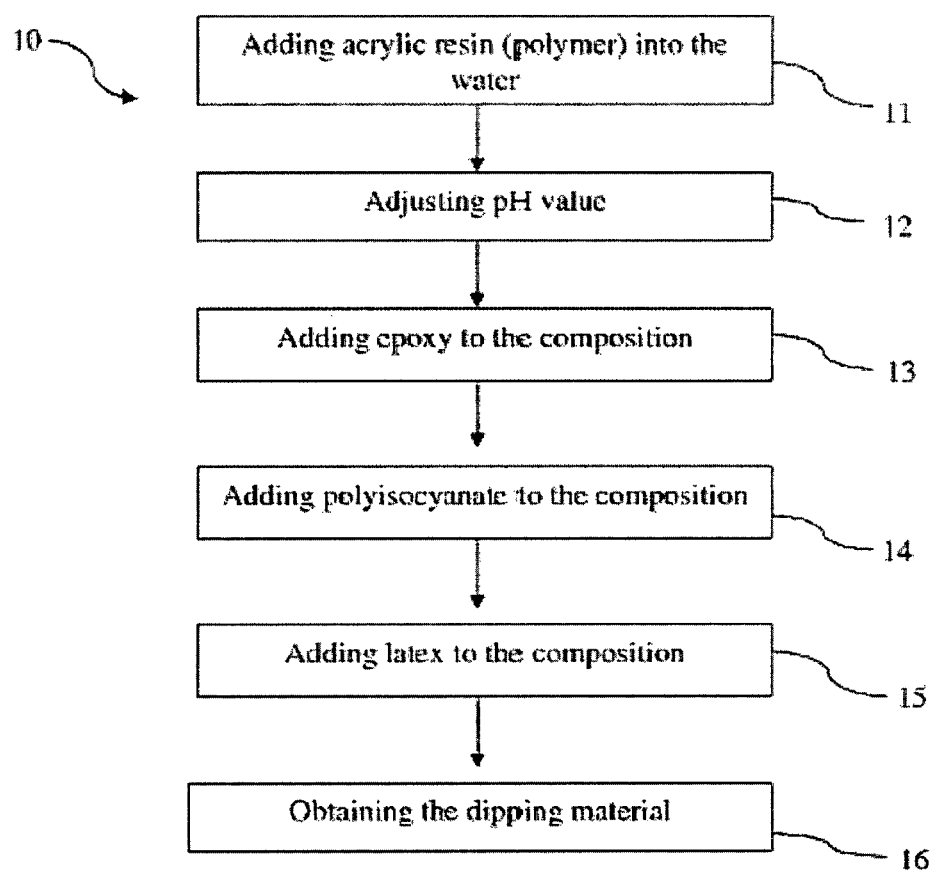

DIPPING SOLUTION FOR CORD FABRICS

This application is a 35 U.S.C. 371 national stage filing and claims priority to PCT Application No. PCT/EP2015/001182, entitled "DIPPING SOLUTION FOR CORD FABRICS," filed Jun. 11, 2015, which claims the benefit of European Application No. 14002027.2, entitled "DIPPING SOLUTION FOR CORD FABRICS" filed Jun. 12, 2014, both of which are incorporated by reference herein in their entirety.

The present invention relates to a dipping solution for cord fabrics which enables the synthetic fiber and the rubber to be attached to each other by providing a phase between the said two structures, and which is environmentally friendly and free of resorcinol and formaldehyde, as well as a production method thereof.

Since the chemical structures of synthetic fibers used in the cord fabric production for the tire industry and the rubber are considerably different from each other, said materials are incompatible with each other in terms of their chemical and physical structures. The synthetic fibers have high strength and low elongation whereas the rubbers contrarily are polymeric materials which have high elongation and low strength. The polar groups (amide, hydroxyl and carbonyl groups) present in the structure of the synthetic fibers are incompatible with the non-polar structures of the rubber. This incompatibility is eliminated with water-based Resorcinol-Formaldehyde-Latex (RFL) adhesive solutions which form a phase between the cord and the rubber and enable the rubber and the fiber to be attached to each other.

Main function of RFL is to serve as adhesive attaching two incompatible structures by forming a phase between fiber and rubber. RF functional group within RFL is attached to the polar groups of fiber, Latex (L) group is attached to the fiber with vulcanization so that a rubber-fiber composite structure is formed. The vehicle tire application is amongst the most significant product examples wherein said composite structure is used. The water based RFL adhesives are applied on cord fabric during "dipping" process which is the final step of cord fabric production. The strength of the bonds formed between the rubber and the cord is examined by means of adhesion tests. Adhesion is a very important parameter in high tenacity cord reinforced rubber products, because cord-rubber adhesion is a critical factor which affects the tire performance.

Formaldehyde-free dipping solutions for rubber materials reinforced with cord have been reported in various studies.

US 2012/0041113 discloses preparing a composition comprising epoxy, blocked isocyanate, an amine-based epoxy curing agent and a vinyl pyridine latex. The fiber cords are immersed in such adhesive composition and then subjected to a drying process and then a heating process.

WO 96/00749 discloses applying dipping solutions formulated with epoxy resins having a functionality of three or greater, and a carboxyl, amide or pyridyl functionalized styrene-butadiene latex, to the polyethylene terephthalate (PET) material and its adhesion strength with rubber.

U.S. Pat. No. 5,118,545 discloses the synthesis of an aramide with multiple double bonds. It is stated that the synthesized resin is applied on the aramide based cord fabric and the double bonds in aramide resin are vulcanized with the double bonds in rubber, and the amide groups provide physical adhesion to the aramide fiber.

U.S. Pat. No. 4,472,463 discloses dipping non-adhesive activated PET fibers with two step process dipping. The first step dipping comprises aromatic glycidyl ester epoxy and blocked isocyanate, while the second step dipping, comprises a latex and an acrylic resin. The latex is a styrene-butadiene-vinyl pyridine copolymer, and the acrylic resin is a carboxylic acid ester copolymer consisting of an alkyl meth(acrylic acid) ester, meth(acrylic) acid and an amide.

US 2004/0249053 discloses an environmentally friendly dipping material, where maleinized polybutadiene is reacted with polyethylene glycol and rendered water soluble. The PET cords modified with epoxy are first dipped with this resin and then with styrene-butadiene-vinyl pyridine latex. However the stripping-adhesion strength of the rubber with PET cords dipped with this resin is lower than the fabrics with RFL.

JP 2011 069020 A discloses a method for producing a resorcinol formaldehyde-free dipping solution which is prepared by mixing an acrylic resin, an epoxy compound, latex and an epoxy curing agent where polyisocyanate is not among the main component of the dip solution.

JP 2012 224962 A discloses an resorcinol formaldehyde free formulation that contains an epoxy resin, an amine curing agent, a blocked isocyanate, styrene-butadiene latex and styrene-butadiene-vinyl pyridine latices.

JP 2013 064037A discloses a method for producing a resorcinol formaldehyde-free dipping solution which is prepared by mixing an urethane resin having a blocked isocyanate group, an epoxy compound, oxazoline functionalized polymer, a polyethyleneimine, a copolymer containing maleic anhydride repeating unit and a rubber latex. In this adhesive system the oxazoline functional polymer is used as a crosslinking agent and the polyethyleneimine as a basic catalyst and crosslinking agent.

RFL adhesive formulations have been used as adhesive material in all synthetic fiber reinforced materials for over half century because of its stable structural characteristics and low cost. However, both resorcinol and formaldehyde are hazardous chemicals which create a great risk for human and environmental health. Therefore, their use has to be limited. Regarding this subject, feedbacks have come from international organizations and customers. It is known that resorcinol causes itching and rash when it contacts the skin, irritates the eye and shows toxic properties in liver and cardiovascular systems.

Formaldehyde is riskier than resorcinol for human health and safety. In 2004, formaldehyde has been classified as group 2A chemical (possible carcinogen in humans) by a group of scientists in International Agency for research on Cancer (IARC) of World Health Organization, and as group 1 (carcinogen for humans) for a group of scientists. In 2009, formaldehyde has been included in list of chemicals causing leukemia by IARC. According to these, formaldehyde is suggested to be gene mutagen. Even low amounts of formaldehyde (1 ppm) cause eye, nose and throat irritation.

Although formaldehyde resins have advantages in terms of cost, both producers and consumers search for alternatives because of the reasons expressed above.

Accordingly, the technical problem underlying the present invention is to provide a dipping material for cord fabrics which comprises more environmentally friendly chemicals than formaldehyde and resorcinol.

Another technical problem underlying the present invention is to provide a production method for a dipping solution of cord fabrics, which takes shorter time than methods used in the state of the art.

A further technical problem underlying the present invention is to provide a dipping solution for cord fabrics, which is in white color and thus makes it possible to produce colorful cords.

The solution to the above technical problems is provided by the embodiments characterized in the claims.

In particular, there is provided a method for producing a dipping solution for cord fabrics, characterized by the steps of adding acrylic polymer resin into water,
adjusting the pH value until pH 5-11 by adding ammonium hydroxide,
adding epoxy to the composition,
adding polyisocyanate to the composition,
adding latex, wherein the latex is a vinyl pyridine (VP) latex and/or a styrene-butadiene (SBR) latex, and wherein the solid amount inside the latex is between 40-45% by weight, particularly there is used at least one latex selected from the group consisting of vinylpyridine-styrene-butadiene, vinylpyridine-styrene-butadiene modified with carboxylic acid, styrene-butadiene, and styrene-butadiene modified with carboxylic acid, as VP and/or SBR latex, wherein the solid amount inside the latex is between 40-45% by weight,
obtaining the dipping solution, wherein the dipping solution comprises the acrylic polymer resin in an amount of 0.1-2% by weight, the epoxy in an amount of 0.1-2% by weight, the polyisocyanate in an amount of 0.7-3% by weight, and the latex in an amount of 6-21% by weight, the remainder being ammonium hydroxide used for pH adjustment and water.

The types of bonds which dictate the final microstructure of the polymer network in the adhesive after the curing process, determine both the initial adhesion and the adhesion retention performance (i.e. retention of adhesion after aging also called aged adhesion) of the cord. A high initial adhesion does not necessarily mean that the cord will retain such high adhesion over time. In fact, when one of the dip solution components is absent or its amount is outside the range given in the present invention, the adhesion retention of the cords goes down to off-spec values despite its acceptable initial adhesion. Therefore, to achieve the targeted adhesion performances, each component of the dip formulation must be used in an optimum stoichiometry. The relative rates of competing reactions, such as carboxylic acid/epoxy, epoxy/polyisocyanate and carboxylic acid (acrylic)/polyisocyanate, alcohol/polyisocyanate (alcohol formed by the reaction of epoxy with the carboxylic acid component) must be taken into account in determining such optimum stoichiometry.

Since most of the reactive components are involved in more than one reaction cited above, the stoichiometric requirement of each reaction depends on the rates of competitive/alternative reactions which determine the relative ratios of different type of bonds formed and thus the final microstructure and adhesion performances. In addition, the rate of each reaction is temperature dependent, thus, any change in process and/or curing temperature changes the stoichiometric requirements and thus the bond distributions and final performances. Therefore, the right adjustment of the stoichiometry requires a good understanding of relative rates of reactions and how these rates are affected by temperature changes. In the present invention, all process parameters and chemical components are interrelated and an arbitrary change in these parameters would, most probably, not result in the targeted performance values.

In the present invention, ammonium hydroxide is employed to preserve the acidic character of the carboxylic acid containing resin [i.e. poly(acrylic acid)] during the curing step, which occurs well above the boiling point of ammonia. The use of ammonium hydroxide ensures that the carboxylic acid functional groups which momentarily are transformed to their corresponding ammonium salts upon the addition of ammonium hydroxide, are recuperated as the ammonia evaporates during the high temperature curing process. The resulting polycarboxylic acid can then react with both epoxy and isocyanate components. In fact, when permanent carboxylate salt forming bases such as sodium hydroxide are employed, an off spec adhesion retention performance is observed. It is well known that carboxylate salts, as compared to carboxylic acids, react poorly especially with epoxy (and isocyanate) groups in the absence of any catalysts.

The dipping material for cord fabrics and the production method thereof developed to fulfill the objective of the present invention is illustrated in the accompanying FIGURE, in which;

FIG. 1 is a schematic flowchart illustrating the method according to the present invention.

In general, the production method for the dipping solution for cord fabrics (10) comprises the steps of:
adding acrylic resin (polymer) into water (11),
adjusting pH value (12),
adding epoxy to the composition (13),
adding polyisocyanate to the composition (14),
adding latex to the composition (15),
obtaining the dipping material (16).

In the production method for dipping material for cord fabrics (10) according to the present invention, first, a functional acrylic resin (polymer) material comprising carboxylic acid is added into the water (1). Regarding the functionality of the resin comprising carboxylic acid, at least one of the monomers such as acrylic acid, methacrylic acid, itaconic acid, crotonic acid, cinnamic acid, maleic acid is used. In a preferred embodiment of the invention, such carboxylic monomer molar feed ratio with respect to monomers containing polymerizable ethylenic unit is between 0.1-100%.

In accordance with the present invention, the presence of oxazoline groups is excluded, i.e. oxazoline functionalized polymers are excluded.

Exemplarily, the acrylic polymer is a self-crosslinking polycarboxylic acid which contains triethanolamine as crosslinking agent.

In the final dipping solution material, the acrylic polymer represents a major reactive component which alters the final microstructure of the polymer network obtained after curing, i.e. in the subsequent process where the cords are prepared. In the absence of the polymer comprising carboxylic acid, the adhesive performance of the dip solution decreases.

Then, the pH value of this composition comprising water and acrylic polymer is adjusted (2). According to the invention, ammonium hydroxide is added to the composition until the pH value of the composition is 5-11. In cases where pH is below 5, the homogeneity of the dipping solution is disturbed as observed in the form of local agglomerations.

After the pH is adjusted to the desired level, epoxy is added into the composition (3). In a preferred embodiment of the invention, the epoxy which is used is water soluble or a water based dispersion. At least one of the materials such as glycidyl based glycerol, sorbitol epoxy, phenol novolac epoxy, cresol novolac epoxy is used as epoxy. However, the actual use is not limited to these. Any epoxy which is water soluble or can be prepared in dispersion can be used in this invention. When the dipping material composition does not contain the epoxy compound, the adhesion between the composition and the fiber cords decreases.

Then, polyisocyanate is added to the composition (4). In a preferred embodiment of the invention, the polyisocyanate is water based and contains thermally dissociating blocked isocyanate groups, for example caprolactam blocked. At least one of tetramethylene diisocyanate, hexamethylene diisocyanate (1,6-diisocyanatohexane), diphenyl methane 4,4'-diisocyanate, octamethylene diisocyanate, decamethylene diisocyanate, dodecamethylene diisocyanate, aromatic diisocyanates including 2,4- or 2,6-tolylene diisocyanate, tetramethylxylylene diisocyanate, p-xylene diisocyanate, 2,4'- or 4-4'-diisocyanatediphenylmethane, 1,3- or 1,4-phenylene diisocyanate is present as part of the polyisocyanate. In a preferred embodiment of the invention, the polyisocyanate is caprolactam-blocked 4,4'-methylene diphenyl diisocyanate or a water based polyurethane prepolymer containing blocked isocyanate groups and having a molecular weight range of 1000-10000 g/mol, particularly between 1500-3000 g/mol. In the absence of a blocked isocyanate, the adhesive performance of the dipping solution decreases.

After the addition of polyisocyanate, latex is added (5). The latex employed comprises butadiene, styrene, and optionally vinyl pyridine monomers. That is, it can be either but not limited to VP latex with monomer ratios of styrene (15%), butadiene (70%) and vinyl pyridine (15%) and/or SBR latex with monomer ratios of styrene, (25%) and butadiene (75%). The solid amount inside the latex is between 40-45% by weight.

The dipping solution is obtained by adding all materials mentioned in the previous steps into the water at room temperature and stirring it (6). Thus, according to the present invention the four components (acrylic polymer, epoxy, polyisocyanate, latex) are employed at the same time, i.e. in a single step.

According to the invention, the dipping solution comprises the acrylic polymer resin in an amount of 0.1-2% by weight, the epoxy in an amount of 0.1-2% by weight, the polyisocyanate in an amount of 1-3% by weight, and the latex in an amount of 6-21% by weight, the remainder being ammonium hydroxide used for pH adjustment and water.

The dipping solution prepared by the inventive production method for cord fabrics (10) can be used for dipping cords such as nylon 6.6, nylon 6, polyethylene terephthalate, polyethylene naphthalate, rayon, aramide, and it is not limited to these. After the cords are prepared in certain constructions (ply number and twist), they are dipped into the inventive dipping material, then dried and cured at between 180-240° C. Subsequently, the dipped cords are pressed into the non-vulcanized (green) rubber composition in molds. This composite material is then cured typically at 170° C. under pressure for about 20 minutes to obtain the final cord.

For exemplary purposes, different acrylic polymers, epoxies and polyisocyanates were used in different ratios and 8 compositions were prepared. The related table is given as Table 1. In said Table 1 below, the strip adhesion values of 8 different mixtures, the composition ratios of which are different, and one Resorcinol-Formaldehyde-Latex (RFL) adhesive solutions are compared.

Table 2 herein below shows a table wherein the effects of resin (acrylic polymer, epoxy and polyisocyanate) composition, the absence of resin components (consequently, Examples 2, 3 and 4 in said Table 2 are not in accordance with the claimed invention), oven temperature and total exposure time of the cord in heat treatment ovens are shown and compared with RFL adhesive solution. The strip adhesion values are indexed according to strip adhesion value of Resorcinol-Formaldehyde-Latex (RFL) adhesive solution.

In an exemplary embodiment of the composition, the amount of solid is determined as 15%, and pH is adjusted to 10 by adding ammonium hydroxide. The inventive dipping solution was used in dipping 2-plied, 1400 dtex value, 396×396 twisted nylon 6.6 cords. The dipped cords were first heat treated for about 30-60 seconds at about 180-210° C., then for about 60-120 seconds at about 180-240° C., particularly at 220-240° C.

Acrodur 950 and 3515 were used as aqueous acrylic functional polymer solution and dispersion, respectively. Both Acrodur 950 and 3515 comprise modified poly(acrylic acid) and polyalcohol with a final solid content of 50%.

EX313 and EX614B were used as water-soluble epoxies. EX313 is a glycerol based glycidyl epoxy, and EX614B is a sorbitol based glycidyl epoxy resin.

Grilbond IL-6 or BN-27 were used as blocked polyisocyanate. Grilbond IL-6 is a water based caprolactam blocked 4,4'-methylene diphenyl diisocyanate with 60% solid content. BN-27 is a water-based, blocked isocyanate containing polyurethane prepolymer with 30% solid content.

The solid contents of VP and SBR latexes are 41%, and their pH values are about 10-11.

With the dipping solution production method according to the present invention, it is possible to obtain a RF free dipping solution for rubber composites by using environmentally friendly chemicals. Furthermore, this method provides opportunities such as cost and time saving. Since the final product is white, it is aesthetically appealing and also enables cord fabrics to be produced in various colors with pigment additives.

Within the framework of these basic concepts, it is possible to develop various embodiments of the inventive dipping material for cord fabrics and a production method thereof. The invention cannot be limited to the examples described herein and it is essentially as defined in the claims.

TABLE 1

| Examples of compositions | Functional acrylic polymer | Epoxy | Polyisocyanate | Acrylic polymer (%) | Epoxy (%) | Polyisocyanate (%) | Latex (%) | Strip adhesion (indexed) |
|---|---|---|---|---|---|---|---|---|
| 1 | Acrodur 950 | EX313 | IL6 | 0.64 | 0.85 | 1.51 | 12.00 | 102 |
| 2 | Acrodur 950 | EX313 | BN27 | 0.26 | 0.35 | 2.39 | 12.00 | 88 |
| 3 | Acrodur 950 | EX614 | IL6 | 0.69 | 0.68 | 1.63 | 12.00 | 66 |
| 4 | Acrodur 950 | EX614 | BN27 | 0.27 | 0.26 | 2.47 | 12.00 | 90 |
| 5 | Acrodur 3515 | EX313 | IL6 | 1.06 | 0.70 | 1.24 | 12.00 | 91 |
| 6 | Acrodur 3515 | EX313 | BN27 | 0.48 | 0.32 | 2.20 | 12.00 | 84 |
| 7 | Acrodur 3515 | EX614 | IL6 | 1.13 | 0.55 | 1.32 | 12.00 | 93 |
| 8 | Acrodur 3515 | EX614 | BN27 | 0.50 | 0.24 | 2.26 | 12.00 | 89 |
| Control | RFL | | | | | | | 100 |

Amounts shown are the solid-based weight percent of each constituent, and the remainder is ammonium hydroxide used for pH adjustment and water.

TABLE 2

| Examples of compositions | Functional acrylic polymer | Epoxy | Polyisocyanate | Acrylic polymer (%) | Epoxy (%) | Polyisocyanate (%) | Latex (%) | 1st Oven (° C.)[a] | Exposure time (sec)[b] | Strip adhesion (indexed) |
|---|---|---|---|---|---|---|---|---|---|---|
| 1 | Acrodur 950 | EX313 | IL6 | 0.38 | 1.16 | 1.96 | 14.00 | 200 | 135 | 102 |
| 2 | Acrodur 950 | EX313 | — | 0.43 | 1.31 | 0.00 | 15.77 | 200 | 135 | 85 |
| 3 | — | EX313 | IL6 | 0.00 | 1.19 | 2.00 | 14.31 | 200 | 135 | 96 |
| 4 | Acrodur 950 | — | IL6 | 0.41 | 0.00 | 2.10 | 14.99 | 200 | 135 | 88 |
| 5 | Acrodur 950 | EX313 | IL6 | 0.38 | 1.16 | 1.96 | 14.00 | 150 | 135 | 60 |
| 6 | Acrodur 950 | EX313 | IL6 | 0.38 | 1.16 | 1.96 | 14.00 | 190 | 135 | 95 |
| 7 | Acrodur 950 | EX313 | IL6 | 0.38 | 1.16 | 1.96 | 14.00 | 240 | 135 | 95 |
| 8 | Acrodur 950 | EX313 | IL6 | 0.38 | 1.16 | 1.96 | 14.00 | 200 | 50 | 50 |
| 9 | Acrodur 950 | EX313 | IL6 | 0.38 | 1.16 | 1.96 | 14.00 | 200 | 90 | 103 |
| 10 | Acrodur 950 | EX313 | IL6 | 0.38 | 1.16 | 1.96 | 14.00 | 200 | 160 | 107 |
| Control | RFL | | | | | | | | | 100 |

Amounts shown are the solid-based weight percent of each constituent, and the remainder is ammonium hydroxide used for pH adjustment and water.
[a]The temperatures of 2nd and 3rd oven are kept constant at 220-240° C.
[b]Total time the cord is exposed to heat.

The invention claimed is:

1. A method for producing dipping solution, free of resorcinol-formaldehyde, for cord fabrics, comprising the steps of:
    adding acrylic polymer resin, wherein functional acrylic resin comprising carboxylic acid is used, into water,
    adjusting the pH value until pH 5-11 by adding ammonium hydroxide,
    adding epoxy to the composition,
    adding polyisocyanate to the composition,
    adding latex, wherein the latex is a vinyl pyridine (VP) latex and/or a styrene-butadiene (SBR) latex, and wherein the solid amount inside the latex is between 40-45% by weight,
    obtaining the dipping solution,
wherein the dipping solution comprises the acrylic polymer resin in an amount of 0.1-2% by weight, the epoxy in an amount of 0.1-2% by weight, the polyisocyanate in an amount of 0.7-3% by weight, and the latex in an amount of 6-21% by weight, the remainder being ammonium hydroxide used for pH adjustment and water, and with the proviso that oxazoline functionalized polymers are excluded.

2. The method according to claim 1, characterized by the step of adding acrylic resin (polymer) into the water wherein at least one of the monomers such as acrylic acid, methacrylic acid, itaconic acid, crotonic acid, cinnamic acid, maleic acid is used as carboxylic acid.

3. The method according to claim 1, characterized by the step of adding acrylic resin (polymer) into the water wherein the carboxylic monomer molar feed ratio with respect to monomers containing polymerizable ethylenic unit is in the range of 0.1-100%.

4. The method according to claim 1, characterized by the step of adding epoxy into the composition wherein epoxy material is used as water soluble or water based dispersion.

5. The method according to claim 1, characterized by the step of adding epoxy to the composition wherein at least one epoxy selected from the group consisting of glycidyl based glycerol, sorbitol epoxy, phenol epoxy, cresol epoxy and epoxy water dispersion, is used.

6. The method according to claim 1, characterized by the step of adding polyisocyanate into the composition wherein a water based blocked polyisocyanate or a water based polyurethane polymer containing blocked polyisocyanate groups is used.

7. The method according to claim 1, characterized by the step of adding polyisocyanate into the composition wherein at least one of tetramethylene diisocyanate, hexamethylene diisocyanate (1,6-diisocyanatohexane), diphenyl methane 4,4'-diisocyanate, octamethylene diisocyanate, decamethylene diisocyanate, dodecamethylene diisocyanate, aromatic diisocyanates including 2,4- or 2,6-tolylene diisocyanate, tetramethylxylylene diisocyanate, p-xylene diisocyanate, 2,4'- or 4-4'-diisocyanatediphenylmethane, 1,3- or 1,4-phenylene diisocyanate is present as part of the polyisocyanate.

8. The method according to claim 1, characterized by using as VP and/or SBR latex at least one latex selected from the group consisting of vinylpyridine-styrene-butadiene, vinylpyridine-styrene-butadiene modified with carboxylic acid, styrene-butadiene, and styrene-butadiene modified with carboxylic acid.

9. A dipping solution for cord fabrics obtained by the method according to claim 1.

10. A dipping process characterized by the steps of heat treating a cord, dipped with the dipping solution according to claim 9, for 30-60 seconds at 180-210° C., then for 60-120 seconds at 180-240° C.

11. A fiber processed by the process of claim 10, wherein the fiber is selected from nylon 6,6, nylon 6, polyethylene terephthalate, polyethylene naphthalate, rayon or aramide cord.

* * * * *